(12) United States Patent
Price

(10) Patent No.: US 7,210,181 B1
(45) Date of Patent: May 1, 2007

(54) SPRING CONSTRUCTION

(75) Inventor: Elvin C. Price, Dacula, GA (US)

(73) Assignee: Atlanta Attachment Company, Lawrenceville, GA (US)

( * ) Notice: Subject to any disclaimer, the term of this patent is extended or adjusted under 35 U.S.C. 154(b) by 94 days.

(21) Appl. No.: 10/962,260

(22) Filed: Oct. 8, 2004

Related U.S. Application Data

(60) Provisional application No. 60/510,492, filed on Oct. 10, 2003.

(51) Int. Cl.
   *A47C 23/04* (2006.01)
(52) U.S. Cl. .................. 5/716; 5/719; 5/247; 5/255; 5/655.7; 267/162
(58) Field of Classification Search .............. 5/256, 5/248; 267/160–162
   See application file for complete search history.

(56) References Cited

U.S. PATENT DOCUMENTS

| | | | |
|---|---|---|---|
| 182,797 A | 10/1876 | Branson | |
| 1,741,847 A * | 12/1929 | Kaspar | 5/655.8 |
| 2,862,214 A | 12/1958 | Thompson et al. | |
| 3,256,535 A * | 6/1966 | Anson | 5/716 |
| 4,057,860 A | 11/1977 | Higgins et al. | |
| 4,112,528 A * | 9/1978 | Higgins | 5/248 |
| 4,160,544 A * | 7/1979 | Higgins | 267/166.1 |
| 4,324,011 A * | 4/1982 | Cavaler | 5/248 |
| 4,463,466 A | 8/1984 | May et al. | |
| 4,523,344 A | 6/1985 | Stumpf et al. | |
| 4,555,097 A * | 11/1985 | Hiatt | 267/100 |
| 4,699,362 A * | 10/1987 | Krakauer | 267/91 |
| 4,901,987 A * | 2/1990 | Greenhill et al. | 267/166 |
| 5,558,393 A * | 9/1996 | Hawkins et al. | 267/162 |
| 5,622,358 A * | 4/1997 | Komura et al. | 267/166 |
| 5,639,074 A * | 6/1997 | Greenhill et al. | 267/162 |
| 5,724,686 A | 3/1998 | Neal | |
| 6,068,250 A * | 5/2000 | Hawkins et al. | 267/162 |
| 6,669,184 B2 * | 12/2003 | Cai et al. | 267/162 |
| 6,758,465 B1 * | 7/2004 | Greenhill et al. | 267/166 |

OTHER PUBLICATIONS

"History of the Bedding Business," *Strobel, Technologies*, http://www.strobel.com/historyBedBus.htm.

* cited by examiner

*Primary Examiner*—Patricia Engle
*Assistant Examiner*—Jonathan Liu
(74) *Attorney, Agent, or Firm*—Womble, Carlyle, Sandridge & Rice, PLLC

(57) ABSTRACT

An improved spring construction for mattresses, box springs, furniture and other applications is provided. The application of such springs in mattresses, box springs, furniture and other applications is also provided. In one aspect of the invention, the spring construction is a spring including a series of spring segments, each having a flattened, irregular configuration where the spring varies in compression strength and deflection from a top portion thereof to a bottom portion thereof.

13 Claims, 5 Drawing Sheets

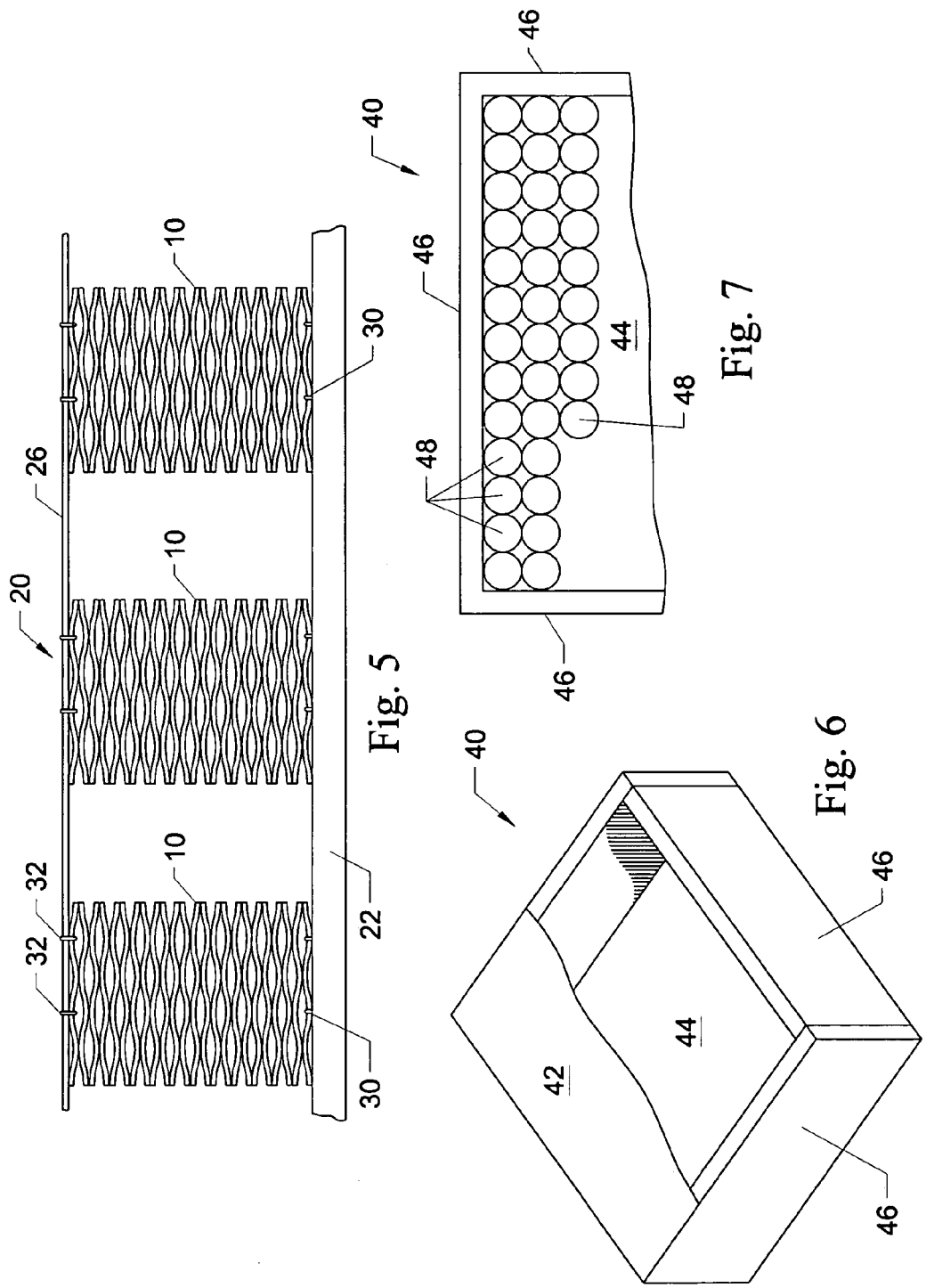

SPRING CONSTRUCTION

CROSS REFERENCE TO RELATED APPLICATION

This application claims the benefit of U.S. Provisional Patent Application No. 60/510,492, filed Oct. 10, 2003 (Price, "Spring Construction"), which is hereby incorporated herein by reference in its entirety.

FIELD OF THE INVENTION

The present invention generally relates to the construction of springs, and more particularly to the design and construction of springs used in mattresses, box springs, furniture and other related applications. The present invention further contemplates the utilization of the spring construction described herein in the manufacture of mattresses, box springs, furniture, and other related applications.

BACKGROUND OF THE INVENTION

It is common in the furniture and bedding industries to use springs for support and shock absorption or cushioning beneath the cushion pads of a seat or for bedding. For example, mattresses and box springs typically include coil springs that support the upper pad or panel of the mattress and function to absorb shock and provide support for a user while on the mattress. Similarly, it is common in furniture to use springs beneath a seat cushion for additional comfort and support to persons sitting in a chair or on a sofa, etc. A problem exists, however, in that the springs generally used for mattresses, furniture and other similar applications generally are manufactured to preset standards for consistency and typically have relatively high compression strengths to support heavy loads placed thereon. As a result, the cushioning provided by the springs may be too little for some consumers, i.e., a bed or seat incorporating such springs will be too stiff or unforgiving, while for some others, the bed or seat will be too soft and not provide enough support. Thus, it is difficult to mass-produce bedding, furniture, etc. that accommodates the needs and desires of a larger majority of consumers.

Typically today in the construction of mattresses, box springs, and seating cushions, coil springs, foam, or in the case of bedding, water or air is used as the supporting means for these devices. Typically in mattresses, a combination of foam and coil springs is used today. One of the issues with this construction is the difficulty in providing differential resiliency from top to bottom in the mattress. In some constructions, a combination of foam and springs have been used to increase the rigidity. However, this has resulted in a loss in resiliency. There are some bedding systems which use springs of a type other than coil springs, for example those offered by Strobel Technologies. The Strobel system uses a series of lever springs in order to provide a mattress with controlled resiliency and a different feel from that of a normal innerspring mattress. In addition, the prior art has also shown a mattress using flat sheet metal leaf springs. In general, the standard construction today remains coil springs and foam, with the resulting limitations in control from this particular configuration.

Accordingly, it can be seen that a need exists for a spring construction for use in mattresses, furniture, and other similar types of seating or bedding products that addresses the foregoing and other related problems in the art.

BRIEF DESCRIPTION OF THE DRAWINGS

FIG. 5 is a side view of a portion of the box spring assembly of FIG. 4 showing the orientation of the spring assembly of the present invention.

FIG. 6 is a perspective view, partially cut away, of an enclosure for a body supporting structure.

FIG. 7 is a partial top view of the enclosure FIG. 6 showing an array of the springs of the present invention in place within this enclosure.

DISCUSSION OF THE INVENTION

Figure 1:
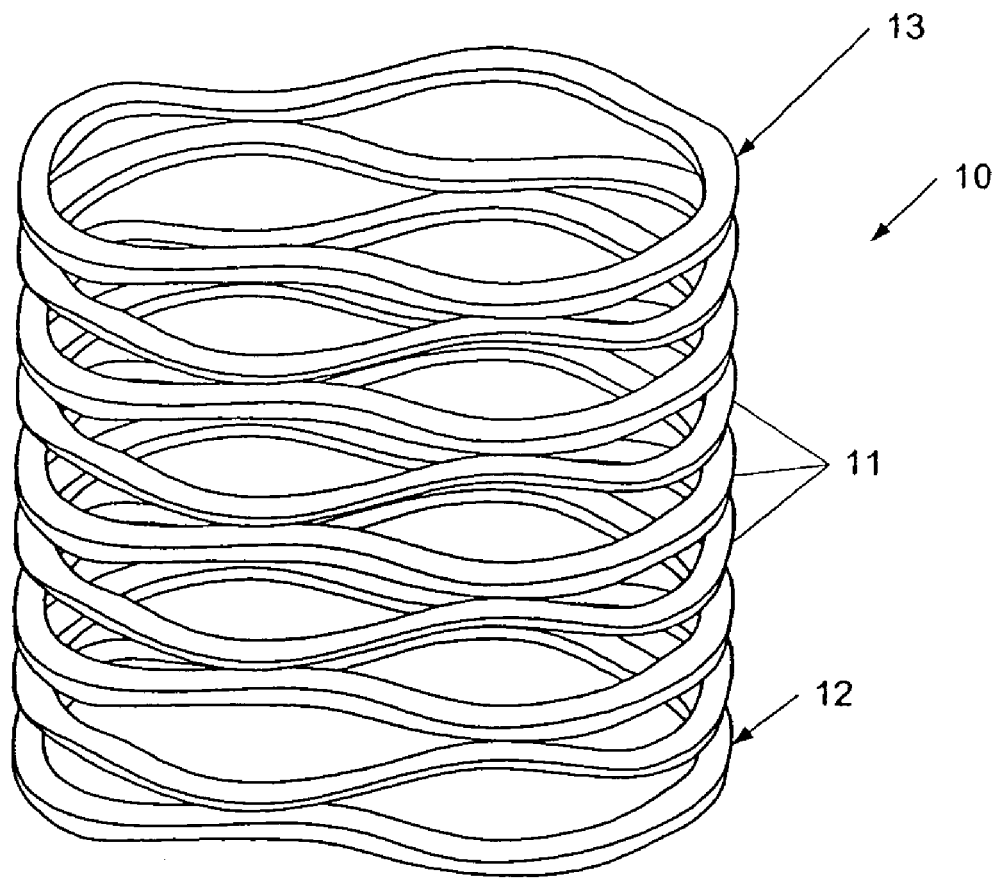
FIG. 1 is a side elevational view illustrating a first embodiment of the spring construction of the present invention.
Figure 2:
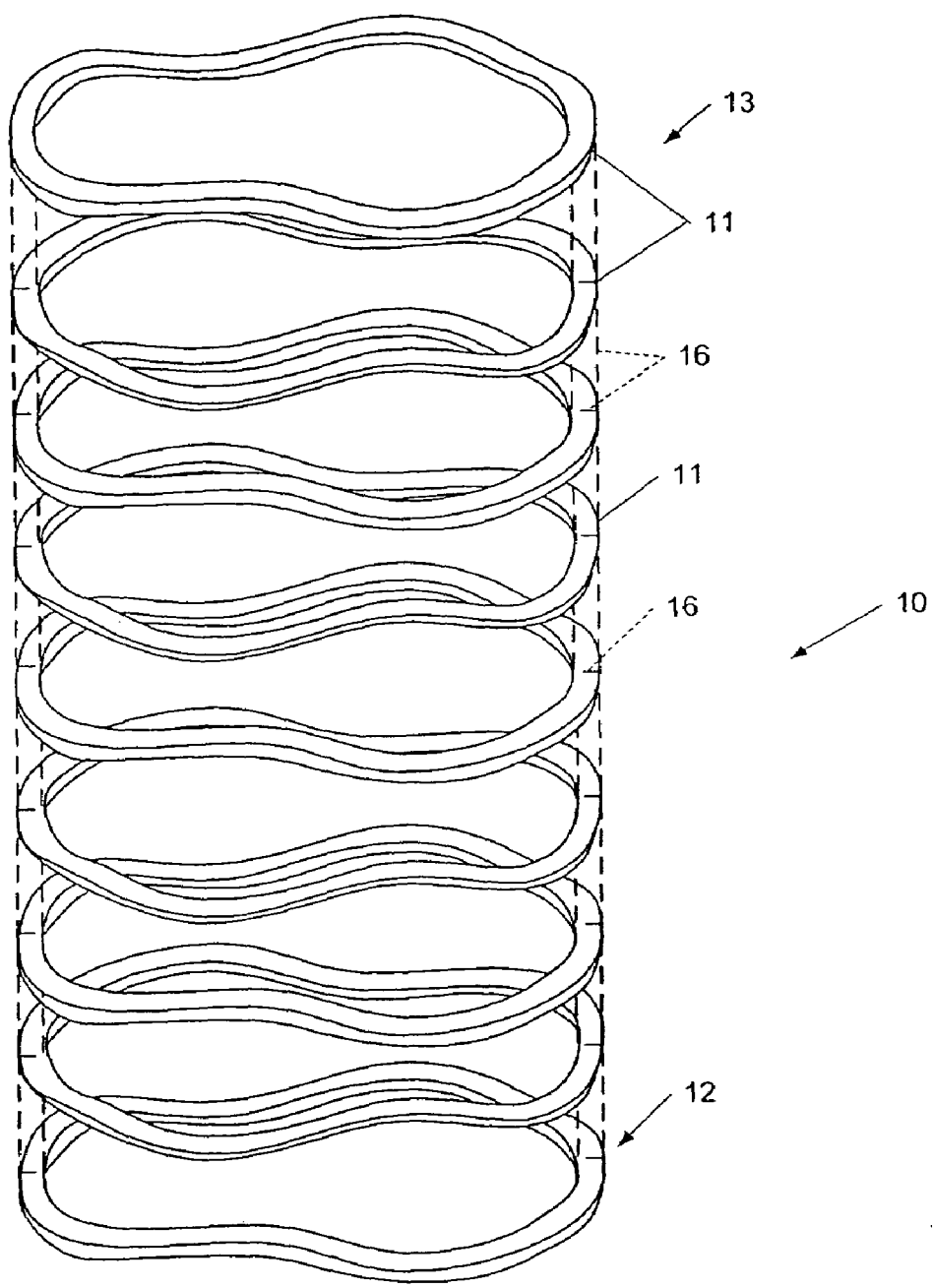
FIG. 2 is a side elevational view of a second embodiment of the spring construction of the present invention.
Figure 3:
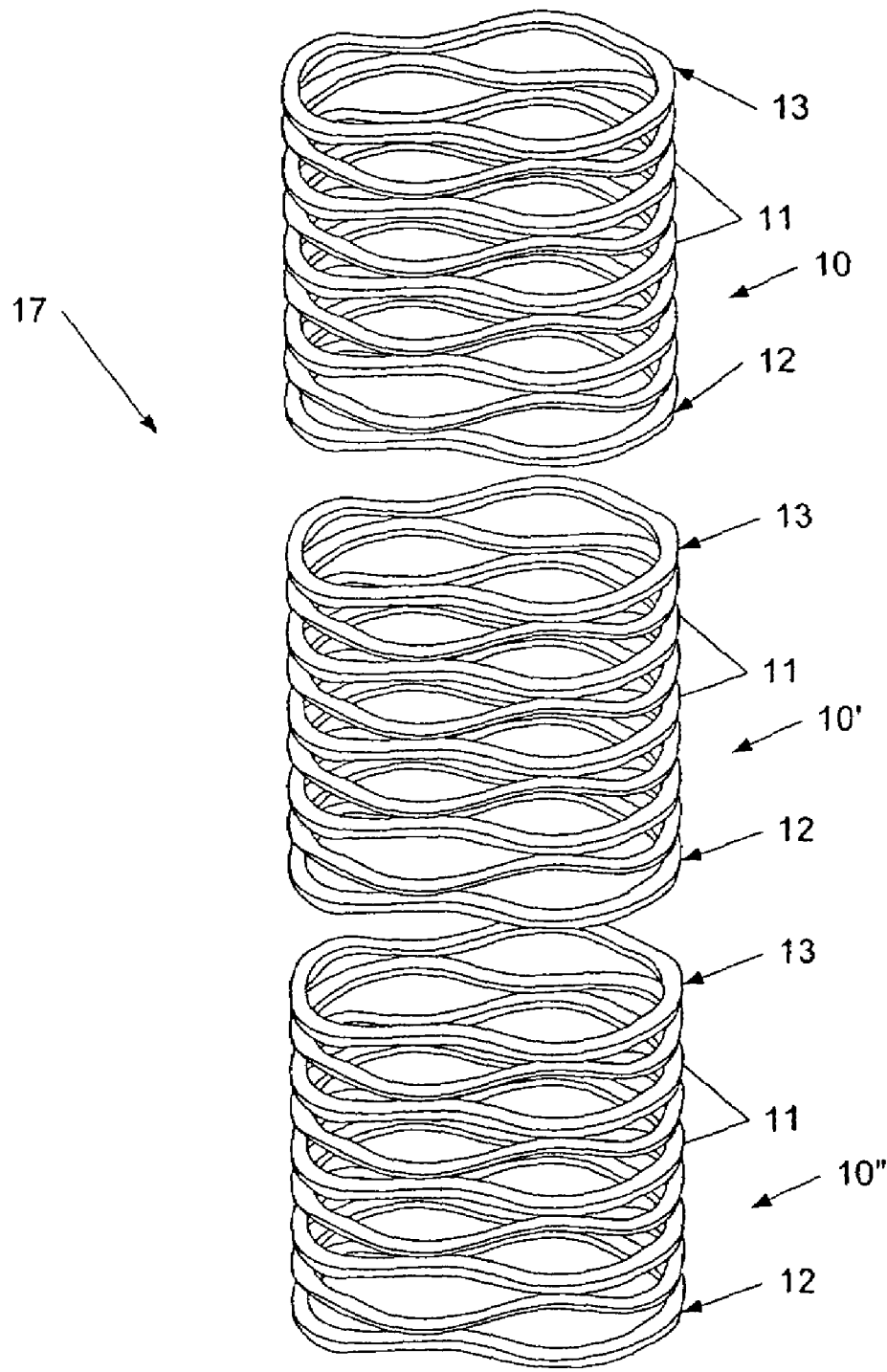
FIG. 3 is an exploded perspective view of a third embodiment of the spring construction of the present invention.

The present invention generally is directed to a spring construction for use in bedding, furniture and other applications such as for mattresses, box springs, couches, chairs and other types of furniture, as well as for automotive seating and other similar types of applications for providing shock absorption, cushioning and support for a cushion or pad. FIGS. 1–3 generally show varying constructions of the present invention, each using one or more "wave" springs such as manufactured by Smalley® Steel Ring Company.

As illustrated in FIG. 1, the spring construction of the present invention generally will include at least one spring 10 having a series of substantially flattened rings or segments 11 having a non-uniform, irregular configuration or construction, as opposed to being substantially round, uniform sections of a drawn wire such as found with conventional furniture or mattress springs. The use of such flat or so-called "wave springs" generally can provide greater strength and deflection with a reduced spring size and a more compact arrangement.

According to one embodiment of the present invention, as illustrated in FIG. 1, the spring 10 will be formed with the rings or segments 11 having varying compression strengths so that the overall compression strength and deflection of the spring 10 will vary across the length or height thereof. As a result, the spring typically can be heavier and have greater compression strength toward the bottom end 12 of the spring, while being weaker and/or having less compression strength, and therefore being more easily deflected or compressed, toward the top portion 13 of the spring. As a result, greater control of the compression of the mattress or seating in which the spring is used can be provided to enable smoother dampening or cushioning of a load placed on the spring.

FIG. 2 illustrates an alternative embodiment of the spring 10 of the present invention in which each of the individual segments or rings 11 are formed separately and are attached via weld lines, indicated with dashed lines 16, to form the spring 10. Each of these segments 11 can be formed with varying strengths of compression and deflection properties so that the resultant spring 10 will vary in compression strength and deflection from its top portion 13 to its bottom portion 12. Alternatively, the spring segments 11 can be clipped, bound, bonded or otherwise attached to each other, or can be hooked or otherwise interlocked together to form the resultant spring structure 10. As a result, as with the spring 10 of FIG. 1, the spring in this embodiment also will be provided with varying levels of compression strength or deflection properties to provide greater control of the deflection or compression of the spring and increasing support as the spring is compressed under increasing weight.

FIG. 3 illustrates still a further alternative embodiment of the spring construction of the present invention in which a series of springs 10, 10' and 10" can be stacked to form a composite spring 17. It will be understood by those skilled in the art that while three springs are illustrated in the example of FIG. 3, fewer, i.e., two, or greater numbers of springs, i.e., four or more, also can be used to create the stacked spring configuration or arrangement 17 generally illustrated in FIG. 3. In this embodiment, the various springs 10, 10' and 10" generally will have different compression strengths and deflection properties. As a result, the composite spring arrangement thus formed will have compression strengths and deflection properties that vary from its top portion to its bottom portion. One result of this arrangement is that a series of springs of substantially varying compressive strength can be built up from a relatively small inventory of components. That is, it can be seen that with a fairly limited array or supply of different strength, springs 10, 10' and 10", each having different degrees of compressive strength and deflection properties, a very large range of spring structures or arrangements having different vertical compression and deflection properties can be constructed. This allows the maintenance of a much smaller inventory of products and simplicity in inventory control, while still allowing substantial flexibility in the construction of seating and bedding products.

Accordingly, with the spring construction of the present invention, not only can smaller, less bulky springs be utilized, while still providing greater compression strength and deflection and thus greater support and cushioning, the amount of support and cushioning provided can be varied in response to the extent to which the spring construction of the present invention is compressed. For example, as lighter weight individuals or loads are placed on the spring, the spring can tend to compress relatively readily to provide enhanced cushioning and softness of feel. However, as further weight or loads are applied thereto and the spring is compressed further, the spring can resist such further compression to a greater extent, to provide increasing support and rigidity as needed.

Alternatively, the construction of the spring 10 of the present invention can be reversed so that the top portion of the spring or composite spring 17 will be provided with greater compression strength and less deflection as needed to provide more rigid feel to the seat, such as for an automotive seat or a mattress. At lower weights or loads being applied thereto, the springs will resist compression to a greater extent to provide a more rigid or stiff feel, with the cushioning of the springs increasing as greater weights or loads are applied thereto. Thus, a mattress, box springs, article of furniture or automotive seats or other, similar articles in which the spring construction of the present invention is used, can be provided with varying amounts of compression, cushioning, and/or dampening effects to accommodate a wider variety of consumer preferences.

Figure 4:
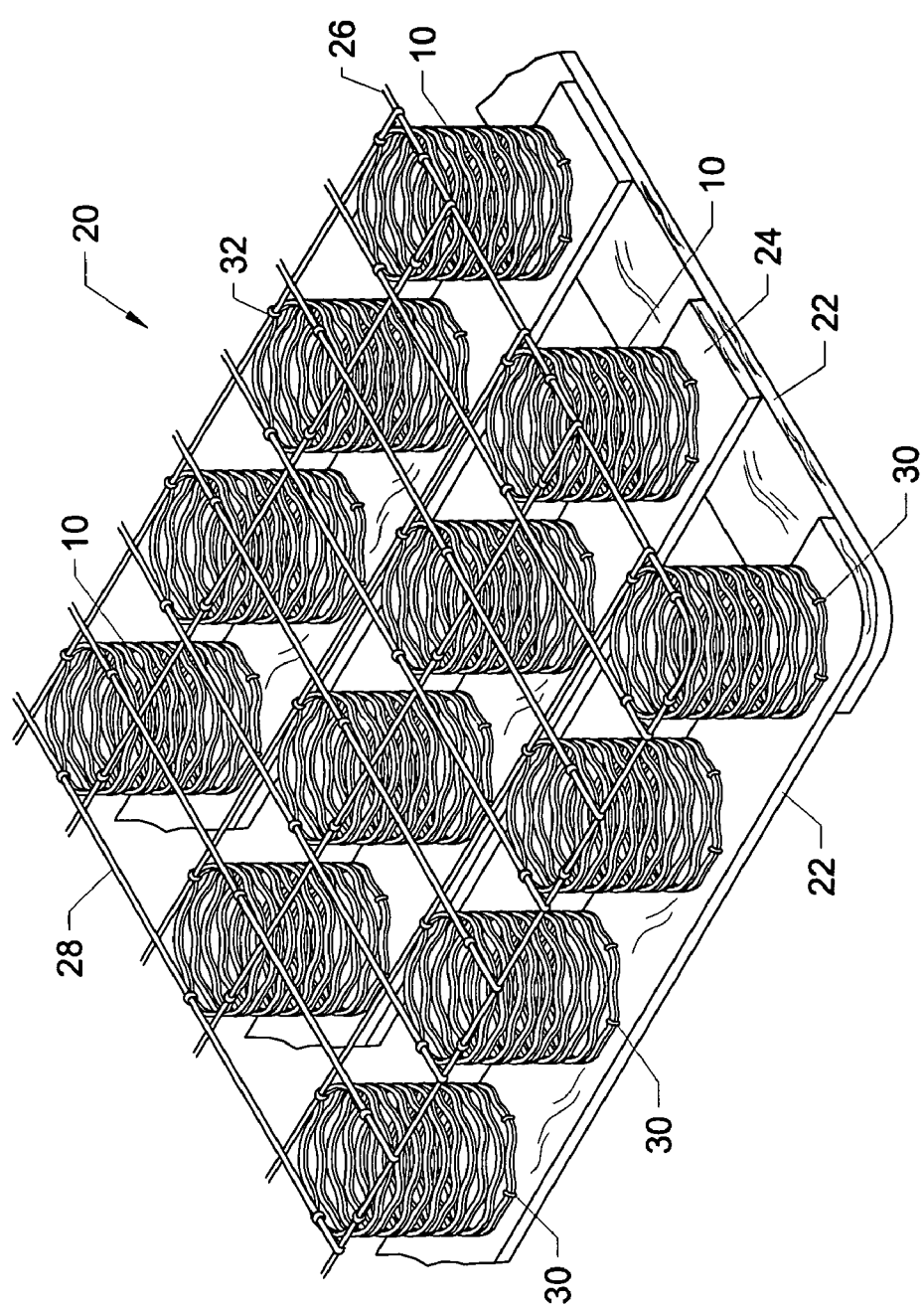
FIG. 4 is a perspective view of a portion of a box spring assembly using the spring construction of the present invention.

FIG. 4 is a perspective view of a portion of a box spring assembly 20 utilizing the spring 10 of the present invention. The basic structure of the box spring assembly 20 is of a relatively conventional construction. There is a base frame 22 that is connected by a plurality of slats 24 to form the general bottom structure of the box spring 20. A border wire 26 is spaced apart from and parallel to the base frame 22 and slats 24. The border wire 26 is then connected by a plurality of wires 28 forming a wire grid. Thus, before any intermediate structure is inserted, the base frame 22 and slats 24, together with the border wire 26 and wire grid 28, form parallel structures. The springs 10 are then inserted between the base frame 22 and slats 24 and the border wire 26 and wire grid 28. The spaced apart spring assemblies 10 sit on the slats 24 or base frame 22 and are attached thereto by fasteners 30. The upper portion of the springs 10 are then attached to either the wire grid 28 or the border wire 26 by fasteners 32. The resulting structure then locks the spring assemblies 10 in place between the base frame 22 and slats 24 and the border wire 26 and wire grid 28. This is a fairly conventional construction for box springs using coil springs, but as pointed out in the present invention, the spring assemblies 10 of the present invention provide the ability to have differential stiffness from top to bottom which is not generally possible with coil springs. In addition, the spring assemblies described with respect to FIGS. 2 and 3 could be used as opposed to the spring assembly 10 shown in the present FIG. 4. The distinction in this case would be the difference in the compression or resiliency of the spring.

FIG. 5 is a side view of a portion of the box spring assembly 20 described in FIG. 4. FIG. 5 shows the spring assembly 10 and the manner in which they are stacked to provide the controlled resiliency that is not possible with the known spring systems.

FIG. 6 shows an enclosure 40 for a body supporting structure or support product. The term supporting structure is used to encompass several types of structures with varying purposes. Mattresses, cushions, and seats for automobile or other purposes are constructed in a somewhat similar manner. Rather than specifically illustrate each of these, the general term supporting structure or support product is used to illustrate the use of the spring of the present invention of products of this nature. The enclosure 40 includes a top wall 42, a bottom wall 44, and a plurality of side walls 46. The top wall 42, bottom wall 44, and side walls 46 are permanently affixed together to form a completely enclosed cavity. FIG. 6 has omitted all of the interior supporting structure for ease of illustration and to understand the general structure. It should be understood that the general structure shown in FIG. 6 can be modified in several different ways, but the end result is to define an enclosed cavity that has within it support means, such as springs, and a finished surface upon which a person may sit or lie.

FIG. 7 is a partial top view of a supporting structure enclosure 40 that has incorporated in it the springs of the present invention. FIG. 7 shows the springs as being enclosed within fabric pockets 48. Typically, conventional pocketed springs used today include coil springs. However, in the present invention the pocketed springs 48 incorporate the spring assemblies 10 (FIG. 1), or 17 (FIG. 3). The pocketed springs 48 are attached together, as is known in the art, by clips between adjacent portions of the springs. By doing this, a supporting structure can be produced that utilizes the spring assemblies of the present invention, in an isolated arrangement, while further providing the advantages that have been discussed with regard to these spring structures.

The flexibility in the manner in which the spring assemblies of the present invention can be assembled to provide for differential degrees of resiliency allow for the construction of an unusually flexible form of supporting product. The pocketed springs 48 shown in FIG. 7 can be configured so that those pocketed springs 48 located in the peripheral rows or first series of peripheral rows can have a degree of resiliency greater, or less if desired, than the pocketed spring assemblies that are in the center of the enclosure 40. The reason to do this would be to provide, for example in an automobile seat, a higher degree of resistance on the edges of the seat cushion than in the center. This would tend to prevent breakdown of seat cushions over time as a result of people entering and exiting the vehicle. Likewise, the perimeter of a mattress could be made with a higher degree of resiliency than the center of the mattress. Once again, this would tend to retain the perimeter in a firm position over time as opposed to allowing a breakdown in the case of somewhat weaker springs.

It will be further understood by those skilled in the art that while the foregoing has been disclosed above with respect to preferred embodiments or features, various additions, changes, and modifications can be made to the foregoing invention without departing from the spirit and scope of thereof.

What is claimed is:

1. A spring assembly for applications, comprising:
   a wire grid;
   a first spring formed from a series of spring segments, each having a flattened, irregular configuration, and with said first spring having a first, predetermined compression strength; and
   at least a second spring formed from a series of spring segments each having a flattened, irregular configuration, and with said second spring having a second predetermined compression strength;
   wherein said first and second springs are stacked in a vertical arrangement, with said stacked first and second springs being arranged in spaced series across said wire grid so as to form a composite spring arrangement for a bedding component that increases in compression strength from a top portion of said composite spring to a bottom portion thereof.

2. A box spring assembly for supporting a mattress comprising:
   a base frame located in a bottom plane of said box spring assembly;
   a plurality of slats extending between opposite sides of said base frame;
   a grid supported on said slats; and
   a plurality of spaced springs mounted on said grid and extending generally perpendicular to said slats, each of said springs including a series of spring segments, each segment having a flattened, irregular configuration with each spring varying in compression strength and deflection from a top portion thereof to a bottom portion thereof.

3. The box spring assembly of claim 2 and further comprising:
   a border wire, generally overlying said base frame, said border wire being located in a plane spaced from and generally parallel to the plane of said base frame; and
   a grid of wires located in the plane of said border wire, said grid of wires comprising a plurality of longitudinal and transverse wires secured at their opposite ends to said border wire, wherein a portion of said plurality of springs extend between and attach to said base frame and said border wire, while a remainder of said plurality of springs extend between and attach to said slats and said wire grid.

4. The box spring assembly of claim 2 wherein said springs comprise individually formed rings, each ring having a desired compression strength, and with each of the ring segments being attached together to form said springs.

5. The box spring assembly of claim 2 wherein said springs comprise a composite spring, each composite spring including a first spring formed from a series of spring segments each having a flattened, irregular configuration with each first spring having a first, predetermined compression strength; and
   at least a second spring formed from a series of spring segments each having a flattened, irregular configuration with each second spring having a second, predetermined compression strength, wherein said first and second springs are stacked in a vertical configuration so as to form a composite spring having varying compression strength from a top portion thereof to a bottom portion thereof.

6. A mattress construction comprising:
   a mattress enclosure structure having bottom, top and side walls defining a cavity, said walls being affixed together; and
   a plurality of spaced springs arranged and supported in spaced series within said cavity of said mattress enclosure, extending perpendicular to said bottom wall and between said bottom and top walls, each of said springs including a series of spring segments each having a flattened, irregular configuration, a top portion having a first compression strength and deflection and a bottom portion having a second compression strength greater than said first compression strength.

7. The construction of claim 6 wherein said springs are made up of at least two spring sets of different compressive strengths, comprising a first spring set of a relatively high compressive strength positioned adjacent a perimeter of said encasing structure and at least one second spring set of a relatively lower compressive strength.

8. The construction of claim 7 wherein each of said at least two sets of springs comprise individually formed ring segments, each ring segment having a desired compression strength, and with each of said ring segments being attached together to form said springs, said desired compression strength of said ring segments being selected to define said two sets of springs.

9. The construction of claim 6 wherein said springs comprise individually formed rings, each ring having a desired compression strength, and with each of said rings being attached together to form said springs.

10. The construction of claim 6 wherein said springs each comprise a composite spring, each composite spring including a first spring formed from a series of spring segments each having a flattened, irregular configuration with each first spring having a first, predetermined compression strength; and
    at least a second spring formed from a series of spring segments, each spring segment having a flattened, irregular configuration with each second spring having a second, predetermined compression strength, wherein said first and second springs are stacked in a vertical configuration so as to form a composite spring having varying compression strengths from a top portion thereof to a bottom portion thereof.

11. The construction of claim 6 wherein said springs are contained within individual fabric pocket enclosures.

12. A method for making a bedding component having a differential compression profile, comprising:
    assembling a first set of spring assemblies including a series of spring segments each having a flattened, irregular configuration and with each spring assembly varying in compression strength and deflection from a top portion thereof to a bottom portion thereof and having a first load deflection characteristic;

assembling a second set of spring assemblies including a series of spring segments, each having a flattened, irregular configuration and with each spring assembly varying in compression strength and deflection from a top portion thereof to a bottom portion thereof and having a second load deflection characteristic;

positioning the first set of spring assemblies on a support at a first location within an enclosure for the bedding component; and positioning said second set of spring assemblies at a second location within the enclosure for the bedding component, thereby providing a differential compression profile for the bedding component.

13. A method of constructing a spring assembly for mattresses and box springs, comprising the steps of:

assembling a first spring from a series of spring segments, each segment having a flattened, irregular configuration, said first spring having a first, predetermined compression strength;

assembling a second spring from a series of spring segments, each segment having a flattened, irregular configuration, said second spring having a second, predetermined compression strength;

stacking the first and second springs in a vertical array;

attaching said first and second springs to one another to form a composite spring having compression strength that increases from a top portion thereof to a bottom portion thereof;

assembling a supporting enclosure having a top wall, bottom wall, and side walls; and mounting the vertical array of the first and second springs within the supporting enclosure.

\* \* \* \* \*